United States Patent [19]

Meyer

[11] 3,855,669
[45] Dec. 24, 1974

[54] ADJUSTABLE STRAP WITH QUICK RELEASE

[75] Inventor: Engelbert A. Meyer, Union Lake, Mich.

[73] Assignee: USM Corporation, Boston, Mass.

[22] Filed: Oct. 5, 1973

[21] Appl. No.: 404,010

[52] U.S. Cl............................................ 24/16 PB
[51] Int. Cl.......................................... B65d 63/00
[58] Field of Search ........ 24/16 PB, 17 AP, 30.5 P, 24/73 PB, 206 A, 208 A, 170, 191, 24; 248/68, 71, 73, 74 PB

[56] References Cited
UNITED STATES PATENTS

| | | | |
|---|---|---|---|
| 3,009,220 | 11/1961 | Fein | 248/74 PB X |
| 3,214,808 | 11/1965 | Litwin | 24/16 PB |
| 3,302,913 | 2/1967 | Collyer et al. | 248/73 |
| 3,486,201 | 12/1969 | Bourne | 24/16 PB |
| 3,537,146 | 11/1970 | Caveney | 24/16 PB |
| 3,605,199 | 9/1971 | Eberhardt | 24/16 PB |
| 3,605,205 | 9/1971 | Crissy | 24/191 |
| 3,731,347 | 5/1973 | Caveney et al. | 24/16 PB |

Primary Examiner—Donald A. Griffin
Attorney, Agent, or Firm—Carl E. Johnson; Vincent A. White; Richard B. Megley

[57] ABSTRACT

A one-piece plastic strap clamp easily releasable from its embracing position about a plurality of workpieces. Legs upstanding from opposite sides of one end of the strap support an integral lever for hinged turning movement. A serrated portion of the strap, after being drawn about the workpieces to be secured, is locked between the legs by teeth formed on a free end of the lever, but is readily releasable by pivoting the lever about an axis extending transversely of the strap.

2 Claims, 5 Drawing Figures

PATENTED DEC 24 1974　　　　　　　　　　　　　3,855,669
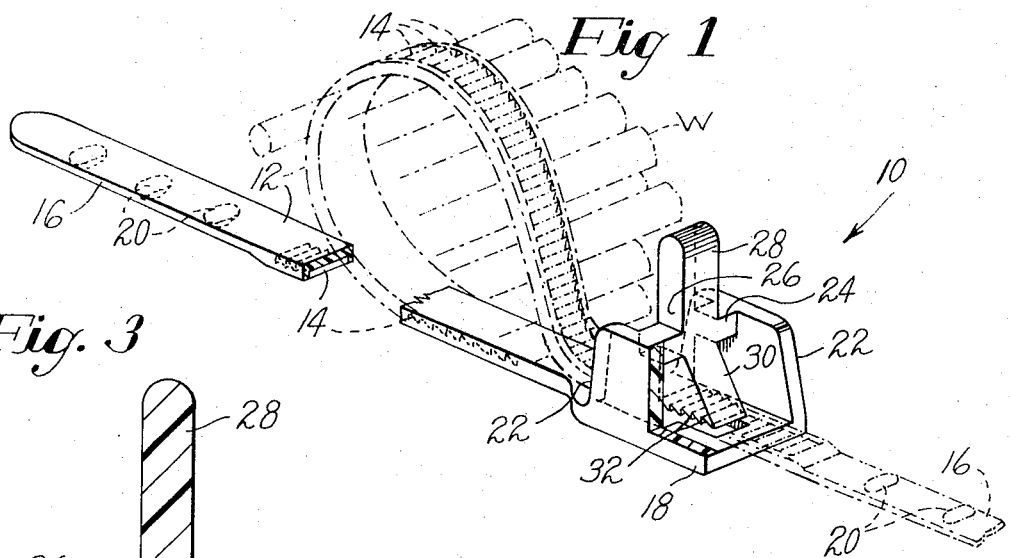
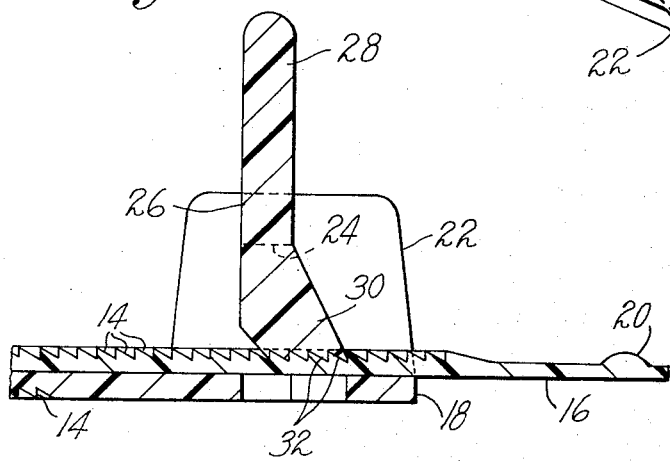
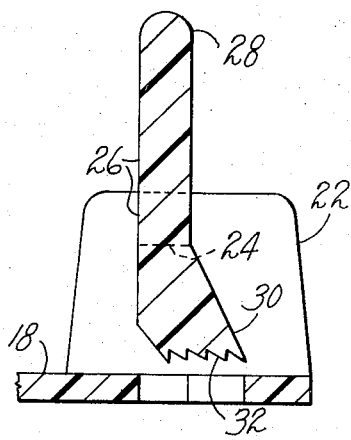
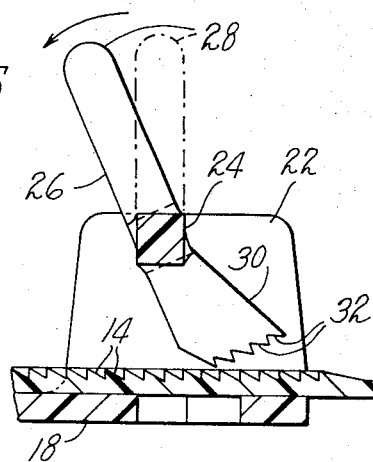
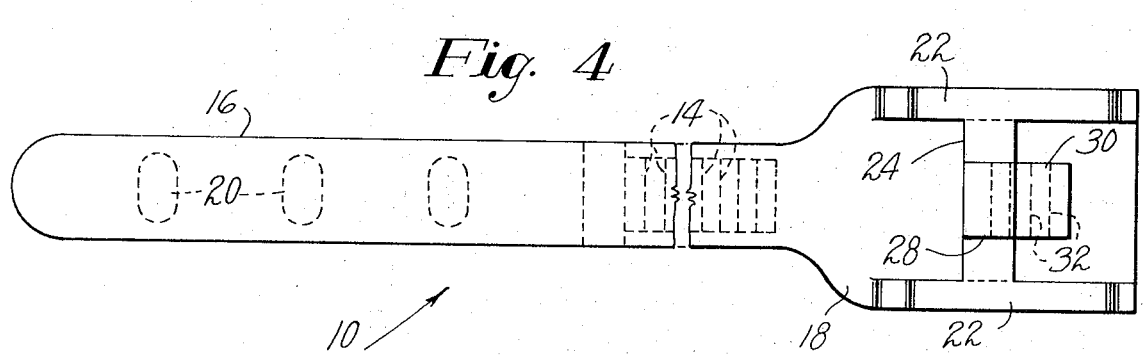

ADJUSTABLE STRAP WITH QUICK RELEASE

BACKGROUND OF THE INVENTION

This invention relates to adjustable brackets or strap type work clamps. These have commonly been employed, for instance, in supporting or binding together in any position elongated elements such as wires or other workpieces. A variety of such flexible fastening means has hitherto been provided in different materials, an end portion of the strap commonly being adapted as a retainer and including clasp structure or the like for receiving and securing an opposite end of the strap in adjusted bound relation to the work.

While the flexibility and adaptability of prior strap clamps has usually been convenient in bundling and securing workpieces in assembled relation regardless of their size and shape, it has often transpired that upon a subsequent occasion, such as when disassembly may be required for purposes of repair, they were difficult if not impossible to dislodge and be released from their holding positions in reusable condition. Moreover, prior art flexible clamps have often been insufficiently simple to become commercially useful. A few adjustable prior art clamps are disclosed by way of example in U.S. Pat. Nos. 2,915,268; 2,979,794; 3,009,220; 3,049,771; 3,086,265; 3,102,311; and 3,302,913.

SUMMARY OF THE INVENTION

In view of the foregoing, it is an object of this invention to provide an improved strap-type clamp of simple and reliable construction and capable of quick release from its work-supporting position.

A further and more specific object of this invention is to provide a one-piece molded plastic strap for supporting a plurality of workpieces and conveniently including an integral latching and latch relasing means.

To these ends and as herein disclosed, a unitary elongated molded plastic clamp strap has a flexible base portion with teeth disposed at least intermediate one side of its length, two substantially rigid legs upstanding from opposite sides of one end of the base portion, and a quick-disconnect lever integrally supported by the legs for resilient hinging movement therebetween, an end portion of the lever being arranged to engage in gripping relation with some of the teeth of the base portion when the latter is looped about the workpieces to be bound, the gripping end portion of the lever being disengageable from the base portion upon torque being applied to another portion of the lever.

Being entirely of non-conductive plastic and preferably inherently resilient, the strap clamp may be color keyed when desired and is expected to enjoy wide use in industry, particularly in the automotive field in conjunction with supporting electric wiring.

BRIEF DESCRIPTION OF THE DRAWINGS

The foregoing and other features of my invention will now be more particularly described in connection with an illustrative embodiment and with reference to the accompanying drawings thereof, in which:

FIG. 1 is a perspective view of an adjustable strap clamp, with a portion broken away, its operative and inoperative conditions being indicated;

FIG. 2 is a longitudinal section of a latching portion of the clamp when in unstressed and inoperative position;

FIG. 3 is a view corresponding to FIG. 2, but with the latching lever now looped and tensioned in work holding position;

FIG. 4 is a plan view of the flexible clamp in inoperative position; and

FIG. 5 is a sectional view showing the latching lever shifted to release condition from a locked condition.

DESCRIPTION OF THE PREFERRED EMBODIMENT

As shown in the drawings, a one-piece flexible plastic strap-type clamp generally designated 10 (FIGS. 1 and 4) comprises an elongated base portion 12 having transversely extending teeth 14 recessed in at least an intermediate portion which is preferably thicker than a leading end portion 16. The latter may be formed with protuberances 20 to aid one in tensioning the clamp. An opposite wider end portion of the clamp has a pair of upstanding leg portions 22,22 projecting in spaced parallel relation from a side of the base portion 18 opposite to that in which the teeth 14 are recessed. The leg portions 22 are integrally interconnected at their upper ends by a bridging portion 24 (FIGS. 1, 3 and 4) which not only stiffens the leg portions 22, but also serves as a resilient joint for supporting a quick-disconnect or latching lever 26.

The bridging portion 24 is desirably rectangular in cross section as shown in FIGS. 1 and 5 and preferably merges with the lever 26 at a locality substantially midway of its length and thus supports the lever for hinging movement between the leg portions 22,22. The lever 26 has a free actuating end 28 disposed on one side of the bridge portion 24, and a gripping end portion 30 extending on the opposite side of the axis of that pivotal joint. Transversely disposed teeth 32 are formed in an enlarged extremity of the gripping end 30. The teeth 32 are angularly biased and arranged, when the base portion 12 is looped around workpieces such as wires W (FIG. 1) to be bound and has been led over the portion 18 and between the leg portions 22, to mesh with the teeth 14 as shown in FIG. 3. When the base portion 12 is drawn taut about workpieces such as the wires W, tension is exerted through the meshing teeth 14,32 but the latching lever 26 can not then be turned clockwise from its holding position shown in FIG. 3 and the clamp 10 is locked to the assembled workpieces W.

It may be noted that the gripping portion 30 of the lever 26, when in latching relation to the base portion 12, has all or substantially all of its teeth 32 disposed to one side of a plane normal to the base portion and extending through the turning axis of the bridging portion 24.

When it is subsequently desired to release the clamp from the workpieces, quick disconnection is effected by applying torque to the free actuating end 28 to move it counterclockwise as shown by the arrow in FIG. 5. This disengages the teeth 32 from the teeth 14 as a result of the counterclockwise motion of the joint portion 24 and of the gripping end portion 30. Now the base portion 12 may be longitudinally moved and shifted with respect to the portion 30 to adjust as appropriate the size of the loop for the workpieces to be secured or released.

From the foregoing, it will be apparent that the strap clamp described is readily releasable by means of the integral latching lever and easily reapplied when desired.

Having thus described my invention, what I claim as new and desire to secure by Letters Patent of the United States is:

1. A molded one-piece plastic strap clamp for binding workpieces together comprising a flexible, elongate base portion having teeth disposed at least intermediate one side of its length, two substantially rigid leg portions upstanding in spaced relation from the opposite side of one end of the base portion, and a quick-disconnect lever hingedly supported by its junction with said leg portions for movement therebetween, said junction being disposed substantially midway of the length of the lever and equally spaced from the leg portions, the junction being at least four times the thickness of the base from said base portion, an end portion of the lever being arranged to engage in gripping relation with some of the teeth of the base portion when the latter is looped about the workpieces and received between the leg portions, said end portion of the lever being disengageable from said teeth to release the base portion upon torque being applied to another portion of said lever.

2. A molded one-piece plastic strap clamp comprising a flexible, elongate base portion having transversely extending teeth recessed therein on one side of its length, two substantially rigid leg portions upstanding in parallel spaced relation from the opposite side of one end of the base portion, a sectionally rectangular bridging portion extending between the free ends of said legs to provide at its mid-portion a joint torsionally resilient about an axis parallel to said recessed teeth when the base portion is received between said leg portions, and a quick-disconnect lever swingably supported by the torsion joint of said bridging portion, the lever having an actuating end portion projecting in one direction from the torsion joint and gripping end portion controlled by the actuating end portion and projecting in substantially an opposite direction from the torsion joint for latching relation with said teeth, the arrangement being such that tension exerted by the teeth in the base portion engaged by the gripping end portion urges the latter to become locked in toggle-like relation between said one end of the base portion and the torsion joint.

* * * * *